United States Patent [19]

Clark

[11] Patent Number: 4,943,913
[45] Date of Patent: Jul. 24, 1990

[54] OPERATING SYSTEM ACCESSING CONTROL BLOCKS BY USING HOME ADDRESS SPACE SEGMENT TABLE TO CONTROL INSTRUCTION AND OPERAND FETCH AND STORE OPERATIONS

[75] Inventor: Carl E. Clark, Poughkeepsie, N.Y.

[73] Assignee: International Business Machines Corp., Armonk, N.Y.

[21] Appl. No.: 154,780

[22] Filed: Feb. 10, 1988

[51] Int. Cl.$^5$ .................. G06F 9/46; G06F 9/34; G06F 9/44; G06F 12/10

[52] U.S. Cl. .................. 364/200; 364/230.3; 364/232.8; 364/241.2; 364/247; 364/256.3; 364/256.4; 364/254; 364/254.3; 364/262.4; 364/280; 364/281.3; 364/281.7

[58] Field of Search ... 364/200 MS File, 900 MS File, 364/200, 900

[56] References Cited

U.S. PATENT DOCUMENTS

| | | |
|---|---|---|
| 3,902,164 | 8/1975 | Kelley et al. .................. 364/200 |
| 4,145,738 | 3/1979 | Inoue et al. .................. 364/200 |
| 4,177,510 | 12/1979 | Appell et al. .................. 364/200 |
| 4,229,790 | 10/1980 | Gilliland et al. .................. 364/200 |
| 4,400,769 | 8/1983 | Kaneda et al. .................. 364/200 |
| 4,456,954 | 6/1984 | Bullions, III et al. .................. 364/200 |
| 4,500,952 | 2/1985 | Heller et al. .................. 364/200 |
| 4,511,964 | 4/1985 | Georg et al. .................. 364/200 |
| 4,758,951 | 7/1988 | Sznyter, III .................. 364/200 |
| 4,783,736 | 11/1988 | Ziegler et al. .................. 364/200 |
| 4,805,097 | 2/1989 | DeSanna .................. 364/200 |
| 4,812,969 | 3/1989 | Takagi et al. .................. 364/200 |
| 4,885,684 | 12/1989 | Austin et al. .................. 364/200 |

OTHER PUBLICATIONS

"EAS/370 Principles of Operation", Chapter 3, Storage, pp. 3—3 to 3-4, 3-13, 3-22 to 3-30 and 5-26.
"Appendix D. Comparison Between 370-XA and ESA/370", D-1.
IBM, "Enterprise Systems Architecture/370 Reference Summary", 1989, pp. 20-25.
IBM, "System/370 Extended Architecture-Reference Summary", 1984, pp. 21-25.

Primary Examiner—Archie E. Williams, Jr.
Assistant Examiner—Emily Y. Chan
Attorney, Agent, or Firm—Lawrence D. Cutter; Joseph A. Biela

[57] ABSTRACT

The creation of address spaces that need not map in their address range all of the routines of the operating system basic control program (BCP) is provided. The BCP, though, will have easy access to (addressability of) the home address space, i.e. to the virtually mapped and addressable control blocks therein. Addressability can be switched from a previously dispatched address space to the home address space. The dispatcher becomes capable of addressing the home address space when predetermined bits in a program status word are set. Once the home address space becomes addressable, the BCP is now capable of easily accessing control blocks in the home address space without the need to modify CPU status or pointers to any other address spaces. If pointers to any other address space are modified, current address translation in the home address space would not be affected. Providing access to the home address space increases performance and reduces complexity.

5 Claims, 6 Drawing Sheets

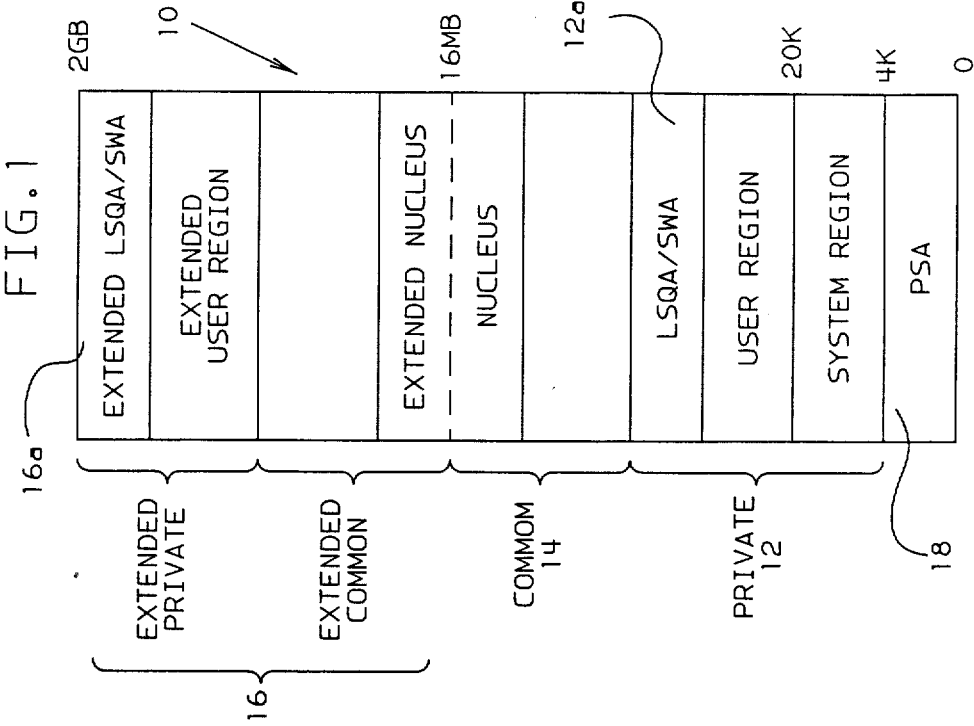

FIG. 1

FIG. 7
ACRONYM LEGENDS

LSQA-LOCAL SYSTEM QUEUE AREA
SWA-SCHEDULER WORK AREA
PSA-PREFIX SAVE AREA
SEG-SEGMENT
ASID-ADDRESS SPACE IDENTIFICATION
ASCB-ADDRESS SPACE CONTROL BLOCK
RCT-REGION CONTROL TASK
TCB-TASK CONTROL BLOCK
DAT-DYNAMIC ADDRESS TRANSLATION
PSW-PROGRAM STATUS WORD
ASC-ADDRESS SPACE CONTROL
MAS-MULTIPLE ADDRESS SPACE
HSTO-HOME SPACE TABLE ORIGIN
HSTL-HOME SPACE TABLE LENGTH
STD-SEGMENT TABLE DESIGNATOR
PKM-PSW KEY MASK
AX-AUTHORIZATION INDEX
SASN-SECONDARY ADDRESS SPACE NUMBER
PASN-PRIMARY ADDRESS SPACE NUMBER
ASN-ADDRESS SPACE NUMBER
CR-CONTROL REGISTER
HASN-HOME ADDRESS SPACE NUMBER
SAC-SET ADDRESS SPACE CONTROL
GPR-GENERAL PURPOSE REGISTER

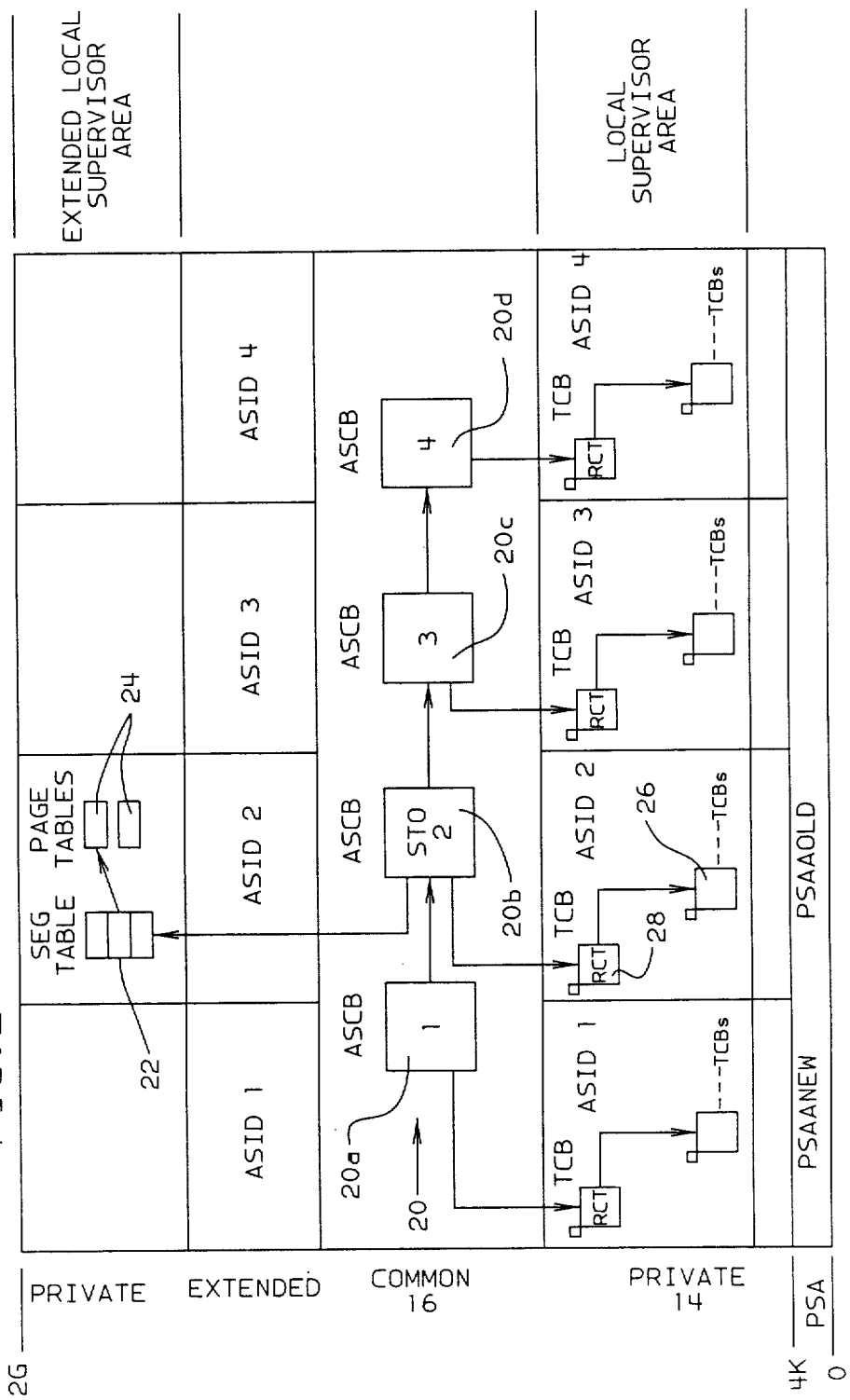

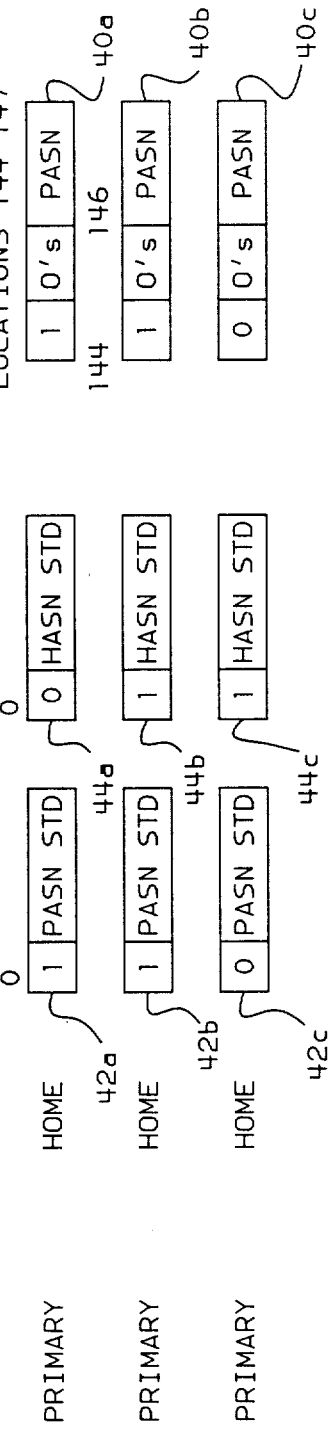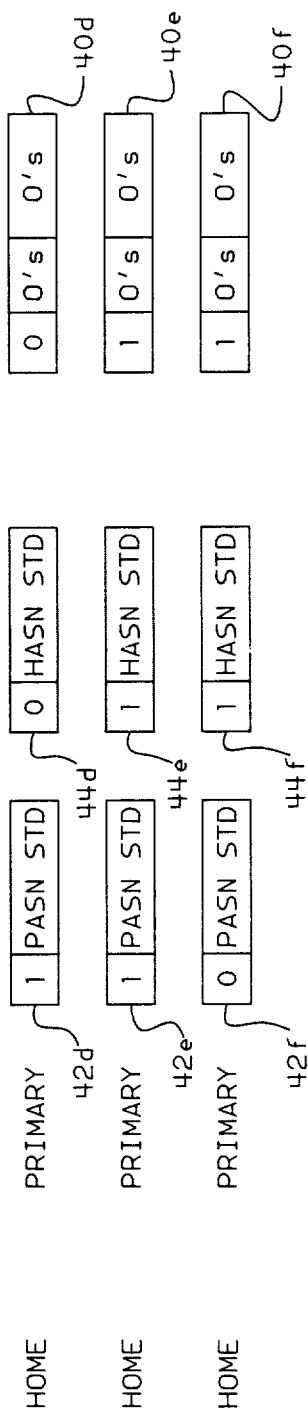
FIG. 4

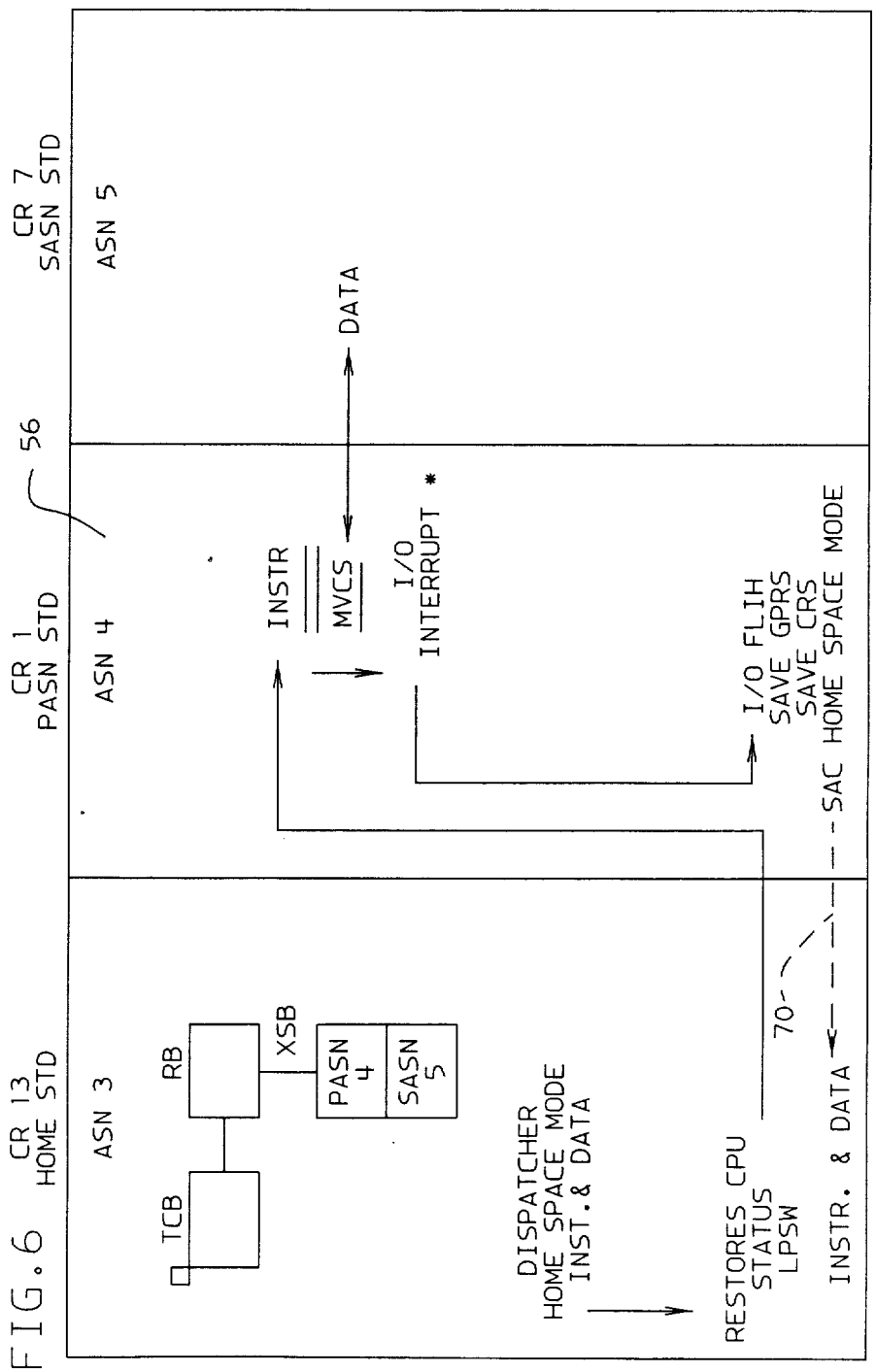

OPERATING SYSTEM ACCESSING CONTROL BLOCKS BY USING HOME ADDRESS SPACE SEGMENT TABLE TO CONTROL INSTRUCTION AND OPERAND FETCH AND STORE OPERATIONS

CROSS REFERENCE TO RELATED APPLICATIONS

This application contains subject matter which is related to the subject matter of the following applications filed on even date herewith and assigned to the same assignee:

"Nonhierarchical Program Authorization Mechanism" by R. I. Baum et al., Ser. No. 07/154,740; "Linkage Mechanism for Program Isolation" by R. I. Baum et al., Ser. No. 07/154,733; "Control Mechanism for Zero-Origin Data Spaces" by C. A. Scalzi et al., Ser. No. 07/154,688; and "Domain Related Access Lists" by C. E. Clark et al., Ser. No. 07/154,685.

FIELD OF THE INVENTION

This invention relates to address spaces and, in general, to address spaces that need not map in their address ranges all routines in the operating system basic control program, and to a home address space that is easily accessible by the operating system basic control program. Specifically the invention is related to the switching of addressability between the home address space and other address spaces.

BACKGROUND OF THE INVENTION

SUPERVISOR

A component of an operating system in a multiprogramming environment provides the controls needed for multiprogramming. In the IBM MVS/XA operating system, this component is called the supervisor. The supervisor takes control once work is brought into real storage where it can be accessed by a central processing unit (CPU).

STORAGE

The mapping of an address space, e.g. MVS/XA address space 10 shown in FIG. 1, shows the various areas of virtual storage. The address space includes private area 12, common area 14, extended areas 16, local queue system areas (LSQA) and scheduler work areas (SWA) 12a and 16a and prefixed save area 18.

In general, storage includes address spaces wherein one address space is a consecutive sequence of integer numbers (or virtual addresses), together with the specific transformation parameters which allow each number to be associated with a byte location in storage. When a virtual address is used by a CPU to access storage, it is first converted to a real address by means of the dynamic address translation (DAT) function described below. DAT uses two levels of tables (a segment table and page tables) as transformation parameters. The designation (origin and length) of a segment table is found, for use by DAT, in a designated one of several control registers in each CPU.

Address spaces may be used to provide degrees of isolation between users. There can be a completely different address space for each user as shown in FIGS. 1 and 2, thus providing complete isolation, or there can be a shared area which is provided by mapping a portion of each address space to a single common storage area. Also, instructions can be provided in a semi-privileged program to access more than one such address space. DAT provides for the translation of virtual addresses in such address spaces.

Each CPU is allocated its own prefixed storage area (PSA). The IBM MVS/XA operating system, for example, uses virtual address 0–4K to access the PSA. In the PSA, MVS/XA maintains two fields as shown in FIG. 2: a first field (PSAAOLD) that indicates the current or base address space active on the CPU, and, a second field (PSAANEW) that indicates the highest priority address space with a dispatchable (ready) unit of work.

PROGRAM STATUS WORD

The program status word (PSW) controls the order in which instructions are executed in an address space and indicates the status of the system in relation to the program currently being executed. Each processor has only one current PSW.

The current PSW is the hardware location in the CPU that indicates the next instruction to be executed. It also indicates whether the CPU is enabled or disabled for I/O interruptions, external interruptions, machine check interruptions and certain program interruptions. When the CPU is enabled, these interruptions can occur. When the CPU is disabled, these interruptions are ignored or remain pending. (A pending interruption is processed when the unit of work that is executing in the disabled state enables.)

A new PSW and an old PSW are associated with each of several types of interruptions. The new PSW contains the address of the first level interruption handler (FLIH) routine in each address space that can process its associated interruption. If the CPU is enabled for interrupts when an interruption occurs, the CPU hardware switches PSWs by:

1. storing the current PSW in the old PSW associated with the type of interruption that occurred; and
2. moving the contents of the new PSW for the type of interruption that occurred into the current PSW.

The current PSW, which indicates the next instruction to be executed, now contains the address of the appropriate FLIH routine to handle the interruption. Control is then transferred to the appropriate FLIH routine.

FLIH ROUTINES

The FLIH routine that receives control saves the status (general registers and the old PSW) of the unit of work that was interrupted, analyzes the interruption, and determines the operating system base control program (CP) action required. Examples of FLIH routines include:

1. SVC FLIH

The supervisor call (SVC) FLIH determines the type and location of the requested SVC routine and, if the requested routine requires that the caller be authorized, checks that the caller has the appropriate authorization. After checking for proper authorization, the SVC FLIH passes control to the requested SVC routine.

2. I/O FLIH

The I/O FLIH passes control to the input/output supervisor (IOS). IOS performs all processing for I/O requests and controls all I/O error processing.

3. PROGRAM FLIH

The program FLIH determines the cause of the program interruption and, depending on the cause, passes control to one of several CP functions to include:
(i) Real storage manager (RSM), if the program interruption was caused by a page or segment fault. RSM determines if the fault is valid and, if it is, starts the processing necessary to either build the page table or bring the referenced page into real storage.
(ii) Recovery termination manager (RTM), if the program interruption was caused by an error in system code or in user code that did not include an error handling routine.

The routine that receives control after the interruption is processed depends on whether the interrupted unit of work was preemptive or non-preemptive and the type of interruption. A non-preemptive unit of work can be interrupted but must receive control after the interruption is processed unless the type of interrupt prohibits the current unit of work from continuing, e.g. a page fault that must be resolved via I/O. If the interrupted unit of work was preemptive, the dispatcher receives control and determines which unit of work should be performed next.

CREATING DISPATCHABLE UNITS OF WORK

In an operating system, and in the IBM MVS/XA operating system in particular, dispatchable units of work are represented by control blocks. For example, there are task control blocks (TCBs) which represent tasks executing within an address space such as user programs and system programs executed to support the user programs. In the MVS/XA operating system, for example, there are multiple address spaces. Each address space is represented by an address space control block (ASCB). (In MVS/XA there are also service request blocks (SRBs) which represent requests to execute a service routine. SRBs are typically created when one address space detects an event that affects a different address space.)

ASCBs AND ADDRESS SPACES

An address space control block (ASCB) is the control block that represents an address space. ASCBs are allocated from storage that is common to all address spaces, e.g. the system queue area. Each address space provides for 2 billion bytes of addressability. The CP assigns some of that (virtual) addressing range to map storage common to all address spaces. The rest of a virtual space maps storage that is private to that space, e.g. a user region. When an address space is created, an address space identifier/address space number (ASID-/ASN) is assigned to the new space created by the address space creation routine operating in the master scheduler's address space. An ASCB is obtained from common storage to represent the address space and it contains the ASID. The initial creation and initialization of the address space begins in the master address space. It is there that storage is obtained for the segment and page tables necessary to provide the address space, represented by ASCB, its own addressability. That is, the address space creation routine invokes the virtual storage manager (VSM) to assign virtual storage and set up addressability for the address space. VSM builds a local system queue area (LSQA) and calls the real storage manager (RSM) to set up the segment and page tables therein. The segment and page tables as well as the storage mapping them are then reassigned from the master address space to the new address space. At this point the new address space has its own virtual addressing capability, i.e. it can map 2 billion bytes of virtual addresses. The newly created address space (represented by an ASCB) can now be added to the dispatcher's ASCB queue. Once the new ASCB is on the dispatcher's ASCB queue, an SRB is scheduled to execute in the new address space. The SRB executes in the new address space and starts the initialization of the address space. It will build the first TCB region control task (RCT) in the address space which will later attach other TCBs. FIG. 2 shows the relationship of the ASCBs (20a, 20b, 20c, 20d), the virtual address space, private and common virtual address spaces (14 and 16 respectively), and the segment tables 22, page tables 24 and TCBs (to include the RCTs) as designated in the figure.

TCBs

TCBs (such as TCB 26 in FIG. 2) are created in response to an ATTACH macro instruction. By issuing ATTACH, a user or system routine causes the supervisor to begin the execution of the program specified on the ATTACH macro as a subtask of the caller's task. As a subtask, the specified program can compete for CPU time and may use certain resources already allocated to the caller's task.

The TCB is used to maintain CPU status of a process (program) that has been preempted and is not currently executing on the CPU. Typical CPU status would include the general purpose registers (GPRs), the PSW, and the primary-ASN (PASN) and the secondary-ASN (SASN) discussed below.

The ATTACH macro instruction causes an SVC interruption. The SVC interruption handler branches to the ATTACH SVC routine to perform the requested service. The ATTACH routine:
1. obtains storage for a new TCB;
2. places information needed to control the subtask in the new TCB;
3. places the new TCB on the chain of the TCBs for that address space; and
4. branches to program management routines to locate the first program to be executed for the new subtask and, if necessary, fetches the program from a program library.

The region control task (RCT), such as RCT 28 shown in FIG. 2, which is responsible for preparing an address space for swap-in and swap-out, is the highest priority task in an address space. All tasks within an address space are subtasks of the RCT. The RCT's TCB is pointed to from the address space control block (ASCB) and points to the next TCB in the address space as shown in FIG. 2.

DISPATCHING WORK

Dispatching work consists of routing control to the highest priority unit of work that is ready to execute. The dispatcher, a supervisor routine, dispatches work in the following order:
1. Exits to routines that have a high priority because of specific conditions in the system.
2. SRBs that have global priority.
3. Ready address spaces in order of priority.
4. Local SRBs for the highest priority address space.
5. TCBs for the highest priority address space.

An address space is ready to execute if it is swapped in and not waiting for some event to complete. An address space's priority is determined by the dispatching priority specified by the user or the installation. The dispatcher makes use of several different queues to include the ASCB queue and a TCB queue. The TCB queue is a local queue found in each address space as shown in FIG. 2, and contains all of the currently defined TCBs (units of work) in the address space. The ASCB queue (20) shown in FIG. 2 is a global queue that identifies the address spaces with ready (unit of) work currently in storage. The ASCB queue also contains the dispatching priority of each address space. ASCBs that represent ready address spaces are queued in storage according to their dispatching priority. The priority is determined by the dispatching priority specified by the user or the installation. To select an address space, the dispatcher selects the first ready ASCB on the chain of ASCBs.

After selecting the highest priority ASCB, the dispatcher dispatches (first SRBs and then) TCBs in that address space.

If there is no ready work in the system, the dispatcher loads an enabled wait PSW. The dispatcher receives control after a task is interrupted or becomes non-dispatchable, and from other supervisor routines that want higher priority work dispatched without waiting for an interruption to occur. The dispatcher saves the status of the unit of work relinquishing control, selects a unit of work, locates the old program status word (PSW) for the selected unit of work, and issues a load PSW (LPSW) instruction, which causes the selected routine to receive control. That routine executes until an interruption occurs or until the routine voluntarily gives up control, e.g. by issuing a WAIT SVC.

MEMORY SWITCH ROUTINE

A memory switch routine (MSR) provides the dispatcher with an indicator that a task in an address space is ready. The MSR makes use of, i.e. updates, the PSAANEW field in the PSA. When work is made ready in an address space, and that address space (ASCB) is higher priority than the address space (ASCB) currently pointed to by PSAANEW, MSR will update the PSAANEW field to the new ASCB and signal the CPU that higher priority work exists. When the dispatcher dispatches a new task in the highest priority address space in response to the MSR indicator, it stores the address of the new ASCB into PSAANEW.

DYNAMIC ADDRESS TRANSLATION (DAT)

Translation of a virtual address in an address space is performed by means of a segment table and a page table, both of which reside in real or absolute storage. The translation tables are designated by fields (pointers) in control registers 1 and 7. The segment table designation used for a particular address translation is called the effective segment table designation. For a primary virtual address, the contents of control register 1 are used as the effective segment table designation, and for a secondary virtual address, the contents of control register 7 are used as the effective segment table designation.

DAT is the well-known process of translating a virtual address in an address space during a storage reference into the corresponding real address. The virtual addresses are translated by means of a segment table designation located in a control register as indicated above. After selection of the appropriate (effective) segment table designation, the translation process is the same for any type of virtual address.

DUAL ADDRESS SPACES

A dual address space (DAS) facility includes two address spaces (primary and secondary) which are available for use by a (semi)privileged program. Control register (CR) 1 is used to contain the designation of a segment table for a primary address space. CR 7 is used to contain the segment table designation for the secondary address space. CR 1 is used when translating primary virtual addresses by DAT and CR 7 is used when translating secondary virtual addresses by DAT.

When the address space control bit, bit 16 of the PSW, is one and DAT is on, the CPU is said to be in the secondary space mode. When the CPU is in the secondary space mode, those operand addresses defined to be logical refer to the secondary address space. When the CPU is in the secondary space mode, it is unpredictable whether instructions are fetched from the primary address space or from the secondary address space.

The instruction SET ADDRESS SPACE CONTROL (SAC) provides a (semi)privileged program with the capability of selecting either the primary space mode or the secondary space mode when DAT is on. Since logical addresses are translated as primary virtual addresses when the CPU is in the primary space mode and as secondary virtual addresses when the CPU is in the secondary space mode, the (semi)privileged program can use the entire set of unprivileged and (semi)privileged instructions to access information in either of the two address spaces.

DAS provides for changing both the primary address space and the secondary address space. Each address space is designated by a 16-bit value, called the address space number, or ASN. The ASN can be used as a primary ASN (PASN) or a secondary ASN (SASN). These two values are not used directly to access an address space but are used as symbolic identifiers of the address space.

Bits 16–31 of control register 4 contain the PASN. The PASN can be loaded by means of a PROGRAM CALL with space switching, a PROGRAM TRANSFER with space switching, or LOAD ADDRESS SPACE PARAMETERS instruction. When the PASN is loaded by means of the (above) DAS instructions, the corresponding segment table designator (STD) is placed in the primary segment table designator (PSTD), bits 0–31 of control register 1. The PASN can also be loaded by means of LOAD CONTROL, in which case no translation occurs to convert the PASN to STD.

Bits 16–31 of control register 3 contain the SASN. When the SASN is loaded by means of the DAS instructions, the corresponding STD is placed in the secondary segment table designation (SSTD), bits 0–31 of control register 7. The SASN can be loaded by means of LOAD CONTROL, in which case no translation occurs to convert the SASN to STD.

By using certain instructions, the (semi)privileged program can specify, by reference to a GPR containing an ASN, a particular address space which is to be accessed. To obtain the segment table designation and other information for the new address space, the ASN is translated by using a set of tables whose origin is contained in CR 14. A two level look-up is used. The ASN value is partitioned into two indices. The first index selects an entry in the table designated by CR 14 called the ASN first table (AFT). This entry designates another table, called the ASN second table, or AST, an entry of which (an ASTE) is selected by the second index. An entry in the second table contains several parameters about the new address space. The information in an ASTE includes:

a validity indicator;

the origin and length of a table which provides control over whether the DAS instructions are authorized to use the new ASN. This table is called the authority table (AT);

the authorization index (AX), or level, of the new space;

the origin (STO) and length of the segment table to be used by DAT when the address space is accessed;

a control over whether a signal, in the form of a space-switch-event program interruption, is given for two of the DAS instructions after a change to a new primary address space is completed; and the origin of a set of tables which describe the entry points associated with a new primary space. These tables are used by the linkage mechanism (LTD) provided with DAS.

CHANGING THE SECONDARY ADDRESS SPACE

The SET SECONDARY ASN instruction causes the secondary address space to be changed to the address space associated with the ASN specified by the instruction. The ASN itself is placed in control register 3 and is called the secondary ASN, or SASN. The ASN is translated to obtain the segment table designation for the space. This designation is placed in control register 7 as the secondary segment table designation (SSTD). Instruction execution is disallowed if the translation is not authorized. The translation is authorized by a bit in the authority table at an offset determined by the authorization index in control register 4. The instruction LOAD ADDRESS SPACE PARAMETERS also can change the secondary address space.

INTERRUPTION

Each task normally has some address space associated with it in which the CP keeps the principal control blocks that represent the task. This is the base address space of the task. Different tasks may have the same or different base address space. When the CP dispatches a task, it may set the primary and secondary address spaces equal to the base address space of the task. Thereafter, because of the task's possible use of such instructions as PROGRAM CALL, PROGRAM TRANSFER or SET SECONDARY ASN, the CP cannot depend on either the primary address space or the secondary address space being the base address space when the base address space must be accessed. For example, a user's task can make "program calls" that go through a sequence of any number of address spaces. This would be the case if a user program made a data base request and the data base manager processed the request through a PROGRAM CALL to a routine in the database manager's own address space. The PROGRAM CALL would set primary addressability to the database manager's address space. The processing of the user request could be interrupted by an I/O interruption. At the time of the (I/O) interrupt, the CP must determine if the current primary segment table descriptor (PSTD) is the base segment table descriptor (BSTD). If not, then the BSTD must be loaded into control register 1 prior to saving the CPU status of the current work. The reverse operation must be performed when the dispatchable unit is dispatched. In other words, the CP must take some special action to ensure that the base address space is addressed when it must be accessed. This special action is described in more detail below.

ADDRESSABILITY TO THE BASE ADDRESS SPACE

When an interrupt occurs, a new PSW, when loaded, contains the address of an interrupt handler, e.g. FLIH. In this example, the FLIH is entered in the primary address mode which is defined by bits set in the PSW. The FLIH routine and the PSA are mapped in every address space. This is necessary because any address space could be the primary address space at the time of the interrupt.

The FLIH routine saves the GPRs and CRs 3 and 4 (PASN and PASN) in the PSA. The FLIH routine then locates the base ASCB from the PSAAOLD field in the PSA. The FLIH then compares the ASID in CR 4 with the ASID in the base ASCB. If the ASIDs are equal, the FLIH routine has addressability to the base address space. If not equal, the FLIH routine is currently executing in an address space other than the base address space, i.e. base ASCB, and must switch addressability to the base address space.

To switch addressability, the FLIH routine or an SVC routine must provide for the appropriate loading of CR 3 and CR 4 for the base ASID. This is accomplished by providing the base ASID as input to the Load Address Space Parameters (LASP) instruction to change PASN and SASN (and their corresponding CPU status) to the base address space.

The LASP instruction is required to establish addressability to the base address space as the primary address space as indicated above. The LASP instruction uses the base ASID to locate the base address space's ASN-second table entry (ASTE). It then extracts the authorization index (AX) from the base address space's ASTE for the PASN AX. The LASP instruction then loads the base ASID and its AX into CR 4 as the PASN and the PASNs AX. LASP then loads a zero value in the PSW key mask (PKM), i.e. bits 0-15 of CR 3, and the base ASID into CR 3 as the SASN. It then takes the STD of the base address space's ASN-second table entry (ASTE) and loads it into CR 1 as the primary STD and CR 7 as the secondary STD. Finally, LASP locates the linkage table descriptor (LTD) of the base address space's ASTE and loads it into CR 5 as the primary ASN's LTD. The FLIH routine now has access to the base address space in primary addressing mode.

As explained above, in a dual (primary/secondary) address space environment, the CP is required to implement a series of operations to determine if the appropriate (base) address space is addressable. If the required address space is not addressable, the CP establishes addressability to the correct address space. However, changing the necessary CPU status to establish addressability to the desired address space is not generally done until the CP saves the CPU status that defines the currently addressable address spaces. These operations reduce performance and add additional complexity and instructions to many of the frequently executed paths of the CP. What is needed is a way to eliminate complexity and improve performance in the frequently executed paths of the CP.

It is therefore an object of this invention to permit the CP to easily access the appropriate address space containing the dispatchable unit of work without significantly modifying any CPU status.

It is a further object of the invention to provide an efficient means for the CP to access its control blocks in a multiple address space environment.

An object of this invention is to eliminate CP code from all other user address spaces.

It is an object of this invention to eliminate complexity and improve performance in the frequently executed paths of the CP.

An object of the invention is to provide an additional level of isolation between the user program and the CP.

Another object of the invention is to easily access a different address space without regard to saving and restoring the status of the primary and secondary address spaces.

Further details that adequately describe the prior art, e.g. instructions and address spaces, are found in the 370-XA principles of operation external document SA22-7085-1.

Additional relevant prior art is found in U.S. Pat. No. 4,500,952 issued to Heller et al and assigned to the assignee of the present invention. In essence, this patent describes the dual address space concept (primary and secondary address spaces) which is the closest prior art to the multiple address space related invention described and claimed herein. In particular, the patent discloses that one program in one address space is permitted to obtain access to data in another address space or to call a program in another address space without invoking a supervisor. Each of a plurality of address spaces assigned an Address Space Number (ASN) has an associated set of address translation tables. A second address space can be designated by a program, and when authorized, can cause transfer of data in main memory from one physical location to another associated with the different address space. A program changeable space selection control bit controls use of two different sets of address translation tables associated with two different address spaces. Without invoking a supervisor, a particular program in an assigned address space can call a program in another address space or obtain addressability to data in another address space having an associated set of address translation tables.

Several U.S. patents have issued that may be pertinent in that they discuss process dispatching, segment descriptors, segment tables and multi-address space environments. Such U.S. patents include U.S. Pat. Nos. 4,177,510 and 4,369,494 both assigned to Honeywell-Bull, and 3,902,164 and 4,476,524 both assigned to IBM.

SUMMARY OF THE INVENTION

The invention involves a data processing system having a CPU, a dynamic address translation facility, a system storage including address spaces and an operating system including a dispatcher. The CPU further includes a program status word and a plurality of control registers which store segment table designators containing pointers to segment tables used by the dynamic address translation facility for translating virtual addresses in at least one of the address spaces in the system storage identified by a field in the CPU. The invention as a method for providing an improved and efficient way for the operating system to access instructions and data in a multiple address space environment to include the steps of dispatching the highest priority address space with a dispatchable unit of work as a home address space which contains control blocks for defining the dispatchable unit of work, loading a pointer to a segment table for the home address space in one of the control registers to provide for virtual address translation in the home address space, setting address space control bits in a field of the program status word in the CPU thereby identifying a home mode and causing the home address space segment table to be the one to be used by the dynamic address translation facility to translate virtual addresses and data in the home address space, and accessing the control blocks by the operating system using the home address space segment table to predictably control instruction and operand fetch and store operations from and to the home address space for the dispatchable unit of work in the home address space identified by the CPU when the program status word in the CPU is set to home mode without modifying any other segment table designators.

BRIEF DESCRIPTION OF THE DRAWINGS

FIG. 1 is a schematic diagram of a typical virtual storage layout containing virtual addresses;

FIG. 2 is a schematic diagram of virtual storage showing queues and tables located in particular areas of virtual storage;

FIG. 4 is a table showing the result of a space switch event which provides for the monitoring of address space mode during address space switching;

FIG. 6 is a schematic diagram illustrating the operation of an interrupt handler when the home address space facility is implemented.

FIG. 7 is a legend of acronyms which are employed in FIGS. 1-6.

PREFERRED EMBODIMENT

The invention is an efficient way for an operating system to access a home (base) address space facility which structurally includes the home segment table designation in control register 13, the address space control bits in the PSW which designate the home space mode, the home space switch event control bit and a means for recognizing a space switch event upon completion of a SET ADDRESS SPACE CONTROL if the CPU was in the home mode either before or after the operation. In general, because of the home space facility, the CP code, for the purpose of providing status saving on interrupts and status restoring on dispatches, need not be in all user (program) address spaces. That is, the home space facility provides for the CP in the home address space to service other address spaces without mapping CP code in all address spaces. Also, the CP (a (semi)privileged program) now has easy (immediate) access to a home address space containing the dispatchable unit of work without significantly modifying any CPU status other than several bits in the PSW.

HOME SEGMENT TABLE DESIGNATOR (HSTD)

Control register (CR) 13 (30 in FIG. 3) contains a home segment table designator (HSTD) wherein bits 1-19 contain the home segment-table origin (HSTO)

and bits 25-31 contain the home segment-table length (HSTL).

Figure 3:
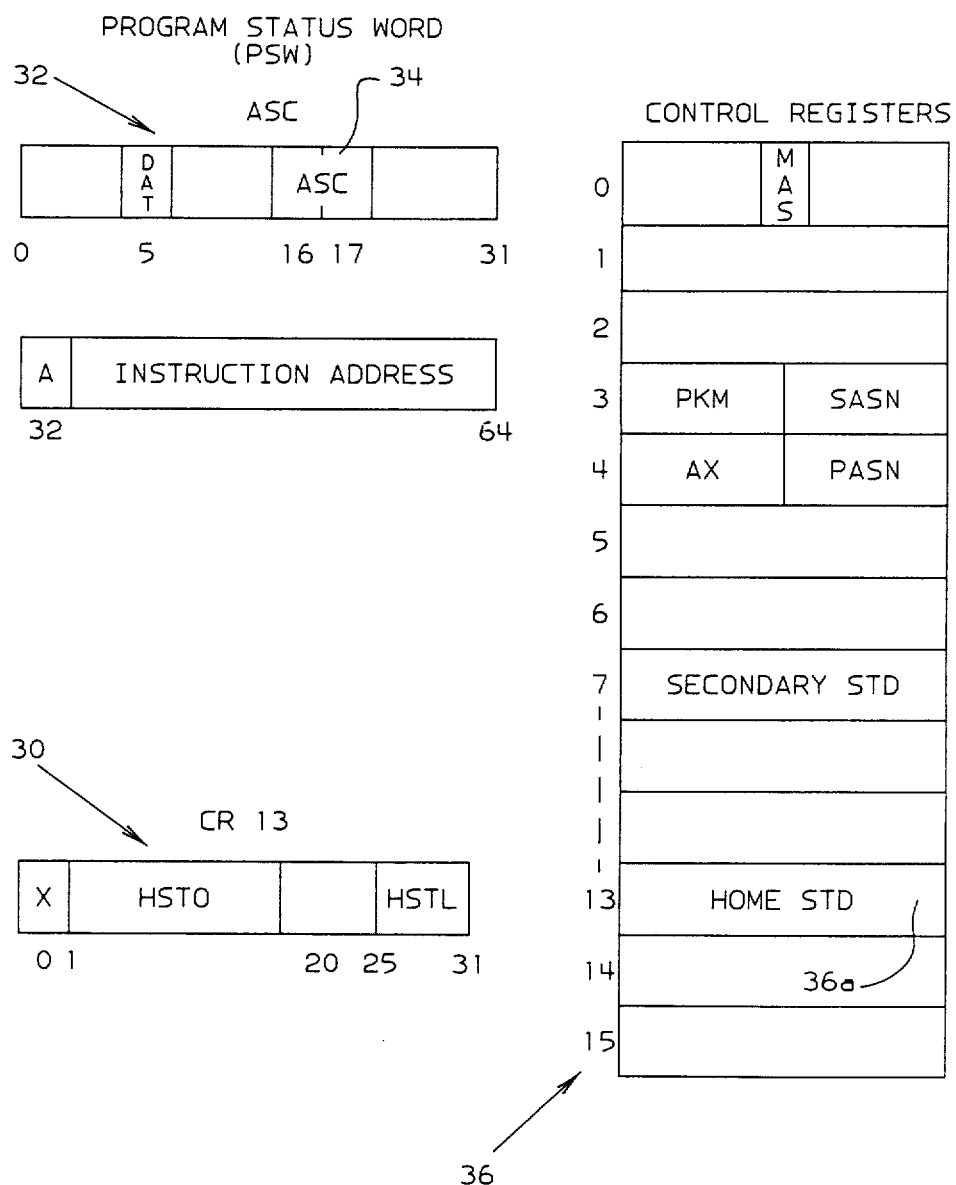
FIG. 3 is a block diagram of the registers used by the dynamic address translation mechanism for virtual address translation.

The dynamic address translation (DAT) mechanism will use the segment table pointed to by HSTO in CR 13 to provide for virtual address translation for instructions and data whenever the CPUs current PSW address space control (ASC) bits (PSW bits 16 and 17 are set to binary B '11') indicate home space mode, dynamic address translation mode (PSW bit 5 is set to binary 1) is on and the MAS control bit (bit 15) in control register 0 is on. FIG. 3 shows the 64 bit PSW 32, ASC bits 34 and control registers 36.

HOME SPACE MODE

Home space mode is activated whenever the current PSW of a CPU has DAT on (PSW bit 5 is one), address-space control bits (PSW bit 16 and 17) equal B '11' and the MAS control bit (bit 15 in CR 0) is on. This mode can be entered only when a supervisor state program executes a LPSW or SAC type instruction that sets the address space control bits to B '11', or by the hardware when loading a new PSW that has its address space control bits set to binary B '11'.

When in home space mode, virtual addresses of instructions and data are translated by DAT using the segment table designated by the home segment table designator 36a in CR 13. When the address space control bits are not set for home space mode, virtual address translation occurs as indicated by the following table:

| ASC BITS | | VIRTUAL ADDRESS TRANSLATION | |
|---|---|---|---|
| 16,17 | MODE | INSTRUCTIONS | DATA |
| 0-0 | primary | CR 1 (PSTD) | CR 1 (PSTD) |
| 1-0 | secondary | CR1 or CR 7 | CR 7 (SSTD) |
| 1-1 | home | CR 13 (HSTD) | CR13 (HSTD) |
| 0-1 | access reg | CR 1 (PSTD) | AR-designate STD |

Based on the setting of the ASC bits, virtual addresses of instructions and data are translated from the PSTD, SSTD or HSTD as indicated in the above table. The phrase "access reg" means access registers which are discussed in the prior co-pending cross-referenced applications and are incorporated herein by reference.

SPACE SWITCH EVENT

There are times when it is desirable to detect when a CPU switches to a particular address space and begins translating virtual addresses with that particular address space's segment table provided in a corresponding CR. It is also desirable to detect when a CPU switches away from an address space to another address space. Since entering or exiting home space mode means the beginning or ending of virtual address translation within the home address space, a means is needed to monitor home space mode activity.

The means used is a space switch event that permits the CP to monitor such activity. A space switch event permits the CP to gain control whenever a program enters (or leaves) the home address space via the SAC instruction and either the PSTD or HSTD has the space switch event control bit set. Bit 0 of the home segment table designation in CR 13 is the home space switch event control bit. A space switch event program interruption occurs after the completion of, for example, a SAC instruction that changes the address space mode either to or from the home space mode when the space switch event control bit is on in control register 13. If the CPU was in the primary address space mode before execution of SAC, the old primary address space number, PASN, (which is in a portion of control register 4 prior to the SAC operation as shown in FIG. 3) will be stored in real locations 146-147 in storage, the old primary space switch event control (bit 0 of CPU control register 1 before the SAC operation) will be placed in bit position 0 of real locations 144-145 in storage and zeros will be placed in bit positions 1-15 of real locations 144-145 in storage. (Real location 146-147 is set to identify the segment table designation, e.g. PASN, used in the translation prior to the SAC operation.)

For a SET ADDRESS SPACE CONTROL instruction that changes the address space mode away from the home space mode, zeros are stored at real location 145-147 and the home space switch event control bit is placed at bit position 0 and zeros are placed in bit position 1-15 of real location 144-145. A program event recording (PER) is reported.

FIG. 4, which is self-explanatory in view of the above comments, shows real locations 144-147 (40a-40f), the primary space switch event control bit (bit 0) in CR 1 (42a-42f) and the home space switch event control bit (bit 0) in CR 13 (44a-44f) under several SACs and with different bit 0 settings.

DISPATCHER

The main function of the dispatcher is to select and give control to the highest priority address space with a ready unit of work (task or process). In particular, when the dispatcher is entered, it searches the ASCB ready queue for the first ASCB with ready work. The address space having a ready TCB and the highest dispatchable priority will be dispatched as the new home address space. (The dispatcher can also select a service request block (SRB) to dispatch. However, for purposes of this discussion only TCBs will be considered. Also for purposes of this discussion, a task is performed through the execution of a program by one CPU at a time.)

The dispatcher selects a task control block (TCB) to dispatch on a CPU according to the TCBs position in the TCB queue in the highest priority address space (ASCB). It then checks a bit mask in the TCB to see if the TCB can run on the CPU currently running the dispatcher.

SWITCHING ADDRESSABILITY

In order to switch addressability from a previously dispatched address space to the home address space, the dispatcher (by way of a privileged instruction such as LOAD CONTROL) also loads the pointer to the segment table, i.e. the home segment table origin (HSTO), for the home address space into a hardware control register, i.e. control register 13, in the CPU. See FIG. 3. The HSTO will be used by DAT to translate the home virtual addresses (and data) in the home address space e.g. a virtual address of a TCB mapped only into the home address space. The home address space is identified by the content of the PSAAOLD field, i.e. by the home address space identifier (HASID) in the ASCB pointed to by PSAAOLD.

The dispatcher becomes capable of addressing (acquires addressability of) the home address space when bits 16 and 17 of the current program status word (PSW) are set (turned on). Bits 16 and 17 are turned on (and off) by execution, in the dispatcher FLIH, or other CP code via the SET ADDRESS SPACE (SAC) instruction or the LOAD PSW (LPSW) instruction. Bits 16 and 17, i.e. the address space control bits, in the PSW, generally control instruction and operand fetch/store operations as indicated by the above table.

In order for the address space control bits to both be turned on, the multiple address space (MAS) facility must first be installed. When MAS is installed, the multiple address space control bit (bit 15 of control register 0) must be one, and the CPU must be in the supervisor state when either SAC or LPSW are used by the dispatcher to set bits 16 and 17 of the current PSW to the home space mode. Otherwise, a privileged operation exception will be recognized.

Figure 5:
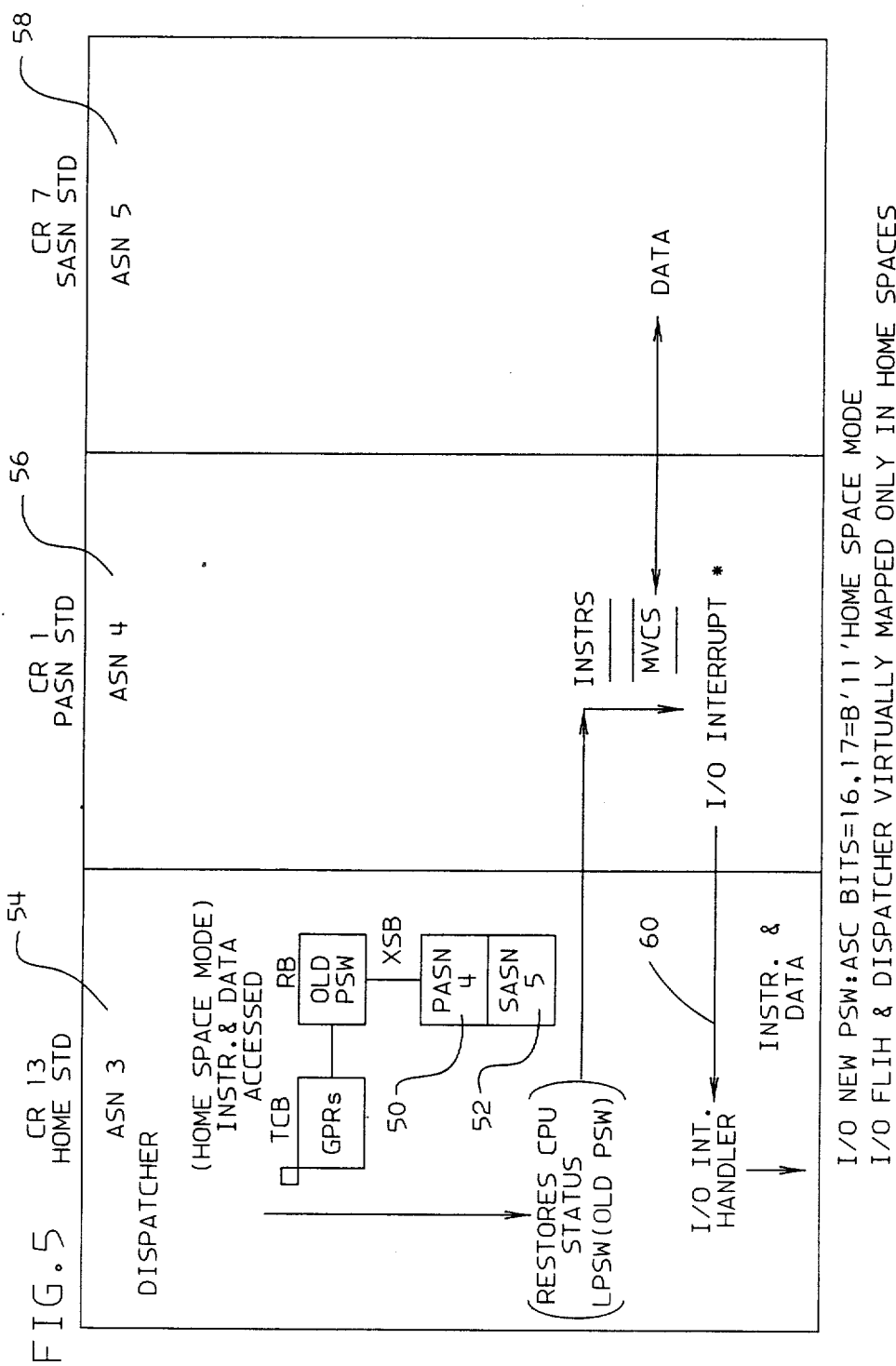
FIG. 5 is a schematic diagram illustrating address space switching from a previously dispatched address space to the home address space of the invention.

The address space control bits, when each is turned on in the supervisor state, indicate that the CPU is in home address space mode, and bit 5 (of the PSW), when turned on, indicates that the DAT function is on (activated). The CP is now capable of easily accessing its control blocks, which define the current dispatchable unit, regardless of which address spaces the primary and secondary segment table designations identify. That is, the CP now immediately accesses its own control blocks in the home address space without modifying the primary and secondary segment table designators. Since such accesses occur frequently, e.g. when CPU status must be saved for a preempted unit of work, when CPU status must be restored for a unit of work to be dispatched and when the structure and control information that represents the dispatchable unit of work is maintained, providing such accesses to the home address space without modifying other pointers (segment table designators) increases performance. The CPU hardware will now execute in home space mode such that logical (storage operand) and instruction addresses will be treated as home virtual addresses and translated by DAT using the home segment designator. That is, now that the dispatcher has acquired addressability of the home address space, and with the DAT bit in the PSW turned on, the next addresses will be fetched from the home address space and translated by DAT using the home segment table pointed to by HSTO in control register 13. Having acquired addressability to the home space and the CP's control blocks, the dispatcher can locate the status of the work that was previously saved when the work was interrupted and pre-empted as shown in FIG. 5. Part of this status is PASN 50 and SASN 52 that was current when the work was preempted. The dispatcher can now load the PASN and SASN and their associated segment table designators into the appropriate CPU control registers (see FIG. 3) without affecting current address translation since the dispatcher is executing in home space mode. Whenever the dispatcher restores the old PSW (of the interrupted work) by the LPSW instruction, the address space control bits will be restored to their former values and dynamic address translation will once again be performed using the appropriate STD.

Fetching of instructions predictably from the home address space when in the home space mode allows CP code to be removed from the address spaces used by user programs.

EXAMPLE OF SWITCHING

As shown in FIG. 5, the dispatcher selects address space number 3 (ASN 3) as the highest priority address space with ready work. The dispatcher loads the segment table designator of ASN 3 into the home segment table designators in control register 13. ASN 3 then becomes home address space 54. Since the dispatcher is now executing in home space mode, i.e. the address space control bits are each set to one, instructions and data will be immediately accessed from ASN 3. (If the work unit selected for dispatch was last executing in (primary) address space number 4 (with ASN 5 as the secondary address space) the dispatcher would reestablish (reload) ASN 4's segment table designator as the PSTD and ASN 5's segment table designator as the SSTD.) Nevertheless instructions and data would continue to be fetched from the home space, i.e. ASN 3, until the dispatcher (a privileged program) issues an LPSW (as shown in the figure) or SAC instruction which would reset (turn off) bits 16 and 17 in the PSW. If the primary space mode were now turned on again (by resetting bits 16 and 17 to B '0 0'), instructions would then be fetched from the primary address space (ASN 4) and data may be fetched from either the primary or secondary address space (56 or 58 respectively). If an I/O interrupt were then received in the primary address space, the new PSW would activate the home space mode again (arrow 60) and the instructions and data would be fetched from the home address space, i.e. from the I/O interrupt handler (FLIH) as shown in the figure. Immediately, the CP has addressability to the work unit such that CPU status regarding the primary and secondary address spaces at the time of the interrupt would be undisturbed and available for storing directly into the dispatchable unit.

INTERRUPTION OF A DISPATCHABLE UNIT

The means for accessing the home address space are intended to allow the CP to have quick access to the principal (FLIH and dispatcher) control blocks for a dispatchable unit, e.g. a task, when the dispatchable unit is interrupted. (These control blocks are virtually mapped only in the home address space.) On interrupt, the hardware fetches a new PSW (in which the address space control bits are ones) from its appropriate location in low real address storage, the HSTO becomes current, due to the setting of the address space control bits in the new PSW, and an FLIH (in the home space) will save the interrupt status of the dispatchable unit in the home address space for the dispatchable unit. When the hardware loads a new PSW to process an interrupt, the hardware uses a real address based off the prefix register value. Therefore, the hardware does not use DAT to locate the new PSW. This is essential in order to eliminate mapping the control program in all address spaces. Since DAT is on, the next instruction will be fetched from the FLIH in the home space and translated, by DAT, using the pointer (home segment table designator) in control register 13. FLIHs no longer exist in the primary address space. The FLIHs are only mapped in the home address space, i.e. interrupts are mapped back to the home address space, and not to the primary address space. (This provides an additional level of isolation between the user program and the CP.) The next instruction will be fetched and the next logical address will be translated via the home segment table designation. The new home address space facility of MAS ensures that the new home address space is always accessed at the appropriate times, e.g. following an interrupt.

ADDRESSABILITY TO THE HOME ADDRESS SPACE

FIG. 6 shows the operations required of an FLIH when the home space facility is implemented.

When an interrupt occurs, a new PSW, when loaded, contains the address of FLIH. In this example, the FLIH is entered in the primary address mode (primary address space 56) as defined by the ASC bits set in the PSW. In this case, the FLIH routine and the PSA are mapped in every address space.

The FLIH routine saves the GPRs and CRs in the PSA. If the FLIH determines that the interrupted unit of work is non-preemptive, the FLIH, after processing the interrupt, will restore the processor status GPRs and CRs and return to the next sequential instruction by loading the old PSW. If, however, the unit of work is to be pre-empted, the FLIH will use the SAC instruction to set the current addressing mode to the home space mode as shown by dotted line 70. The SAC instruction is then executed and sets the ASC in the PSW to the home space mode. The CP now has addressability to the FLIH control blocks in the home address space. The FLIH now saves the processor status GPRs and CRs in the work unit's control blocks.

The FLIH enters the dispatcher which has current addressability to the home space. If an address space switch is indicated, the dispatcher can access the next address space's control block by loading CR 13 with that address space's home STD, i.e. the STD for primary address space 56.

If the FLIH was entered in the home address space mode, as defined by the ASC bits set in the PSW, the CP would have immediate addressability to the FLIH control blocks in the home address space.

Notice that no other segment table designators or CPU status had to be modified in order to establish addressability to the home address space.

Thus, while the invention has been described with reference to preferred embodiments thereof, it will be understood by those skilled in the art that various changes in form and details may be made without departing from the scope of the invention.

What is claimed:

1. In a data processing system having a CPU, a dynamic address translation facility, a system storage including address spaces and an operating system including a dispatcher, said CPU further including a multi-field program status word and a plurality of control registers which store segment table designators containing pointers to segment tables used by said dynamic address translation facility for translating virtual addresses in at least one of said address spaces in said system storage accessible to said CPU, a method for providing an improved and efficient way for said operating system to access control blocks, instructions and data in a multiple address space environment, said method comprising the steps of:

a. dispatching, via said dispatcher, an address space having the highest priority with a dispatchable unit of work as a home address space which contains control blocks for defining said dispatchable unit of work;

b. loading a pointer to a segment table for said home address space in one of said control registers to provide virtual address translation in said home address space;

c. setting, via a CPU instruction, address space control bits in a field of said program status word in said CPU thereby identifying a home mode and causing said home address space segment table to be the one to be used by said dynamic address translation facility to translate virtual addresses in said home address space; and then d. accessing said control blocks by said operating system using said home address space segment table to predictably control instruction and operand fetch and store operations from and to said home address space for said dispatchable unit of work in said home address space accessible to said CPU when said program status word in said CPU is set to home mode, without further modification of any other segment table designators.

2. The method of claim 1 in which switching addressability to said home address space from a previously dispatched address space is free from dependency on the content of said other segment table designators.

3. The method of claim 2 in which said previously dispatched address space is a base address space.

4. The method of claim 2 further including a step in which said operating system accesses instructions and data in said home address space.

5. The method of claim 3 further including a step in which said other segment table designators are subsequently loaded by said dispatcher without disrupting said operating system access to said home address space.

* * * * *